Aug. 29, 1950  E. E. WEMP  2,520,350
CLUTCH PLATE
Original Filed Jan. 15, 1942  2 Sheets-Sheet 1
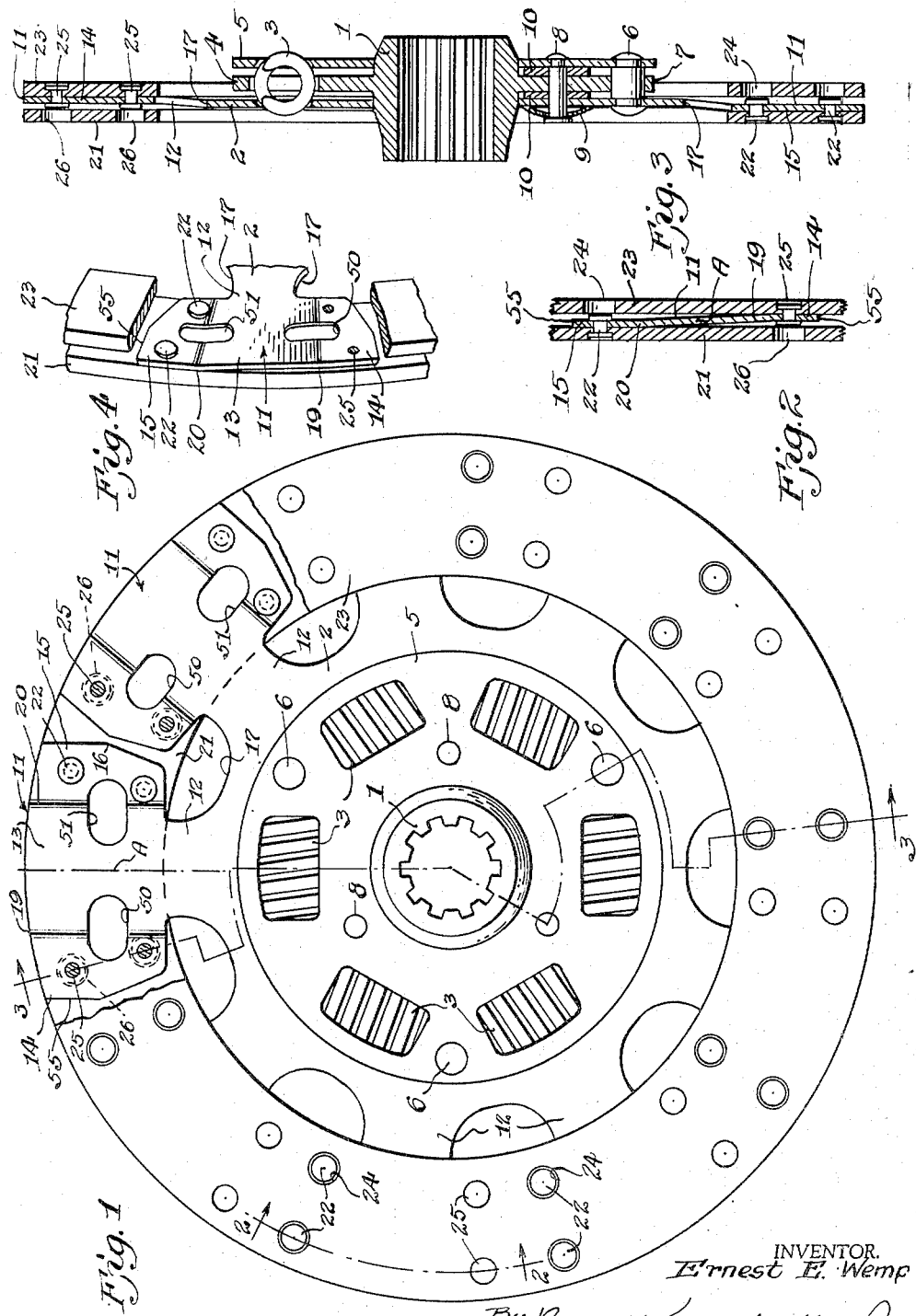
INVENTOR.
Ernest E. Wemp
By Barnes, Kisselle, Laughlin & Raisch
ATTORNEY Aug. 29, 1950     E. E. WEMP     2,520,350
CLUTCH PLATE
Original Filed Jan. 15, 1942     2 Sheets-Sheet 2
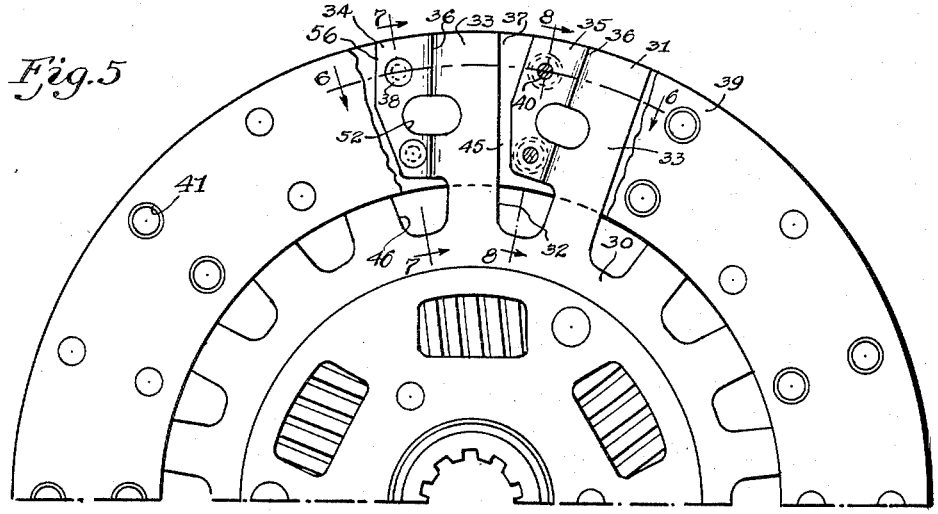
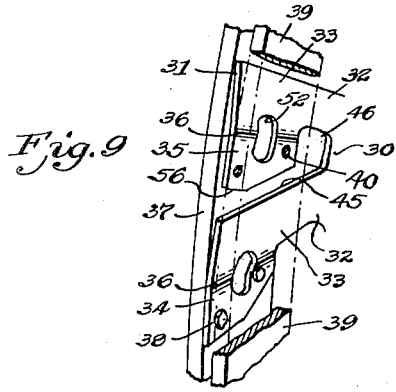
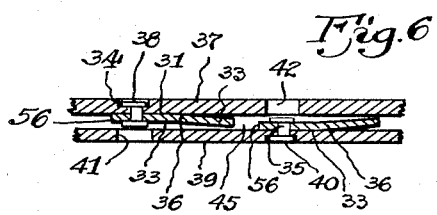
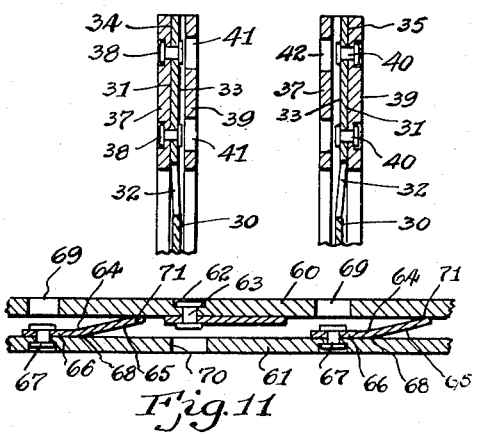
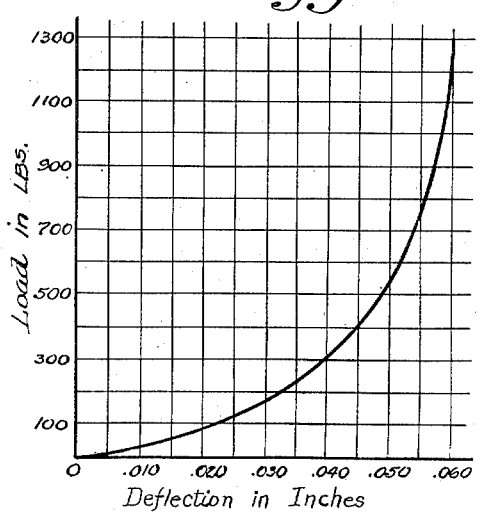
INVENTOR.
Ernest E. Wemp
BY Barnes, Kisselle, Laughlin & Raisch
ATTORNEY Patented Aug. 29, 1950

2,520,350

UNITED STATES PATENT OFFICE 2,520,350

CLUTCH PLATE

Ernest E. Wemp, Detroit, Mich.

Application January 15, 1942, Serial No. 426,802, which is a division of application Serial No. 191,145, February 18, 1938. Divided and this application November 23, 1945, Serial No. 630,218

2 Claims. (Cl. 192—68)

This invention relates to friction members for brakes or clutches, and it has to do particularly with a construction of a disc such as may be used as a clutch driven member or a friction member of a brake.

This application is a division of application Serial No. 426,802, filed January 15, 1942, now Patent No. 2,391,495, which is a division of application Serial No. 191,145, filed February 18, 1938, now Patent No. 2,307,006, which is a continuation in part of application Serial No. 173,332 filed November 8, 1937, and now abandoned.

The invention is directed particularly to the provision of an improved disc for use with clutches for transmitting power from internal combustion engines, and particularly, in automotive vehicles and for use as a friction member in disc type brakes. The disc of this invention is one designed to be packed between clutch driving members or disc brake members and the disc is arranged so that it is capable of compression in order to facilitate a smooth and gradual clutch and brake engagement, and a general nicety of clutch and brake action.

Among the objects of the invention is the provision of a disc construction which is yieldably compressible and which will provide a desired or proper deflection curve, while the yielding elements are comprised of parts integral with the disc body. To this end the construction is such that the disc resists compression both by torsion or twisting of some of the portions of the disc body and by a bending action. Initial stages of clutch engagement, for example, may cause a torsion or twisting action, while later stages of clutch engagement may take place during a bending action, and in this manner a deflection curve, which is relatively flat in the initial stages of compression and which rises more sharply in the later stages of clutch engagement, is provided.

In the accompanying drawings:

Fig. 1 is a view of a clutch disc constructed in accordance with the invention with some of the facing cut away illustrating underlying disc structure.

Fig. 2 is a sectional view taken substantially on line 2—2 of Fig. 1.

Fig. 3 is a cross sectional view taken through the disc substantially on line 3—3 of Fig. 1.

Fig. 4 is a perspective view with part of one facing cut away illustrating the disc structure.

Fig. 5 is an elevational view of a modified form of construction with some of the facing cut away illustrating underlying disc structure.

Fig. 6 is a cross sectional view taken substantially on line 6—6 of Fig. 5.

Fig. 7 is a cross sectional view taken substantially on line 7—7 of Fig. 5.

Fig. 8 is a cross sectional view taken substantially on line 8—8 of Fig. 5.

Fig. 9 is a perspective view with one facing cut away and illustrating the disc structure.

Fig. 10 illustrates a deflection curve obtained with the disc constructed in accordance with this invention.

Fig. 11 is a view similar to Fig. 6 illustrating another modified form.

The clutch member as shown herein is in the form of a driven disc or member for a friction clutch having a hub 1 arranged to be splined on to a driven shaft, and a disc body member 2. The disc and hub may be connected by a vibration dampening arrangement in the form of an annulus of coil springs 3 located in aligned openings in the disc 2, flange 4 of the hub and a washer 5. The washer 5 is connected by rivets 6 to the disc 2 so as to operate in unison therewith, the washers passing through clearance notches 7 in the flange of the hub. Rivets 8, each with a spring washer 9 at one end, pass through the members as illustrated in Fig. 3, and friction material 10 is disposed between the disc and hub flange and between the washer and hub flange. Driving forces are transmitted from the disc to the hub and vice versa through the coil springs, and when they flex there is a spring loaded friction action afforded by the friction material 10. This is just one form of construction which may be embodied in the member between the disc body and hub and this construction is substantially that as shown in Patent No. 2,042,570 of June 2, 1936.

The disc body advantageously is of spoke construction, particularly in its outer zone. As illustrated in Fig. 1, the spokes are generally illustrated at 11, and each having a neck 12 and an enlarged head. The head, as illustrated, may be visualized as having three portions, namely, a center portion 13, and lands 14 and 15 on opposite sides thereof. A spoke of this formation is provided by slotting the disc as at 16 and providing the slots with enlarged portions or openings 17.

Each spoke has a twisted formation with the twist formation being substantially centralized on a radial line running through the center of the portion 13 of the spoke. This center line is generally illustrated at A in Figs. 1 and 2. At the line A this portion of the spoke is substantially in the plane of the body of the disc and the center portion 13 is inclined so that it extends to opposite sides of the center plane. Between the center portion and each land is a bend line illustrated at 19 and 20, so that the lands 14 and 15 are substantially positioned in planes parallel to the plane of the disc but axially removed to opposite sides thereof. In the actual formation of the spokes the bend lines do not appear to be abrupt, although theoretically the bend lines occur substantially on the lines 19 and 20. The actual appearance is a good deal like the illustration shown in Fig. 2. The shading in Figs. 1 and 2 is slightly exaggerated to demonstrate the formation.

Two facing members are secured to the disc, one on one side and one on the other. The facing member 21 is secured to the lands 15, as for example, by rivets 22. It will be understood that each spoke is formed like the one just described, so that all of the lands 15 project to the same side of the center plane of the disc and are in a position to be secured to the facing 21. The facing 23 may be provided with clearance openings 24 for the heads of the rivets 22 and is secured by rivets 25 to the lands 14, the facing 21 being provided with clearance apertures 26 for the rivets 25.

It will be observed that with this construction the facings are normally held in axially spaced relation, but they are capable of moving toward each other as the disc is collapsed or compressed incident to being packed between clutch driving members. In initial clutch engagement, force is transmitted to the lands 15 from the left as Fig. 2 is viewed, and this is resisted by a like force transmitted to the lands 14 from the right. This causes a twisting or torsion action on each spoke substantially around its center line. As this is continued the extreme edge portions of the lands 14 and 15 will come into contact respectively with the facings 21 and 23. The bend line 20, however, is at this time spaced from the facing 23, and the bend line 19 is spaced from the facing 21. Continued addition of clutch pressure now tends to bend the metal, the tendency being to straighten the bends 19 and 20, and ultimately, if sufficient pressure is applied, these bent portions will be straightened out. During the bending action the spokes are also twisted so that the compression is resisted by bending and torsion. It is not essential, however, that sufficient pressure be added to completely straighten out the bend formations.

In the form shown in Fig. 5 each spoke has but a single land. In this form the hub and associated parts have the same reference characters applied as are used in the form shown in Figs. 1 to 4. The disc body is illustrated at 30, while the spokes are generally illustrated at 31. Each spoke has a neck portion 32, which connects into a body portion 33 on one side of which is a wing or land. Alternate spokes have wings or lands 34 while the intervening spokes have wings or lands 35. The body portion 33 of alternate spokes are twisted or are angularly disposed so that the lands 34 are positioned on one side of the center plane as illustrated in Fig. 6, and the lands 35 on the opposite side. The lands join to the body portions of spokes substantially on bend lines 36 which, however, may not be abrupt, as illustrated in Fig. 6, so that the lands substantially parallel the plane of the disc. The facing 37 on one side is secured to the lands 34 by rivets 38 and the facing 39 on the opposite side is secured to the lands 35 by rivets 40, the facings having clearance holes 41 and 42 for accommodating the rivets. The edge of the spoke 31 opposite the edge of the lands lies substantially in the plane of the disc. The spokes are separated by cut-out portions 45, which are preferably enlarged as at 46 to obtain the desired dimensions of the necks 32.

In this form the initial action which takes place as the clutch begins to engage is a torsion action on the spokes, twisting them toward a position of alignment in the plane of the disc. In other words, considering Fig. 6, the pressure on the facing 37 twists alternate spokes, tending to force the lands 34 into the plane of the disc, and the reacting pressure on the facing 39 twists alternate spokes tending to urge lands 35 into the plane of the disc. Ultimately, the extreme opposite edges of alternate spokes will come into contact with the facings, with the bend formation presenting arch-like formations between the facings, and as the packing pressure of the clutch is increased the tendency is to bend the metal, thus tending to straighten out the bend formation.

In designing the clutch disc the resistance offered by the torsion action may be varied by varying the dimensions of the necks 12 and 32. In the form shown in Fig. 1 the initial clutch engagement exerts twisting or torsion action on the necks 12; and by varying the length, width and thickness of the necks, the resistance to this torsion action may be governed as desired. The necks can be varied as to length and width by changing the shape of the cut-out openings 17, and as to thickness by selecting clutch disc stock. In the form shown in Fig. 5, the necks 32 may be varied as to length and width by the shape of the cut-outs 46, and, of course, by variation in the thickness of the stock. In the form shown in Fig. 1 the necks 12 are of considerably more width than the necks 32 in Fig. 5, and because the necks 12 are twisted by forces from two lands on opposite sides of the center line, whereas the necks 32 are twisted only by one land. In some instances it may be desirable to form the necks so that opposite edges thereof are parallel substantially as illustrated in Fig. 5, and in this way there is a substantially equal distribution of stresses in the twisting of the necks. In Fig. 1 opposite edges of the necks 12 are substantially parallel for a short distance, and then terminate on radii, but opposite edges of the neck have the same formation.

The form shown in Fig. 1 has some advantages over that shown in Fig. 5. Each spoke is twisted by equal forces delivered to opposite lands; therefore the tendency to shift the spoke bodily out of the plane of the disc is substantially eliminated; whereas in the form shown in Fig. 5 the body of the spoke is called upon to resist forces delivered to it from one side until such time as the facings come close enough together so that opposite edges of a spoke are in contact with one facing. Moreover, any tendency of the facings to expand or contract, due to heat variations, are balanced out in a better manner in the form shown in Fig. 1, as each spoke is connected to a facing on opposite sides thereof; whereas in Fig. 5 each spoke is connected only to one facing. Notwithstanding these advantages which the Fig. 1 construction has over the Fig. 5 construction, the Fig. 5 construction is nevertheless a perfectly practical type of structure capable of operating in accordance with the invention.

It will also be observed that in both forms of the invention the spokes have apertures formed therein. In Fig. 1 each spoke has two apertures, at 50 and 51, located substantially in the bend formation, while the spokes shown in Fig. 5 each are apertured as at 52. The location of these apertures may be varied by shifting them radially inwardly or outwardly and by so doing the strength of the beams on opposite sides of the apertures may be governed. The term "beam" is applied to those portions of the spokes which engage both facings and hold the facings yieldingly spaced apart by resistance to bending. In Fig. 1, that part of the body portion 13 on one side of the center line and land 14, and that part of the body portion 13 on the opposite side of the center line and land 15, all lying radially outwardly of the openings 50 and 51 may be termed a beam. The term "beam" is also applied to similar portions lying radially inwardly of the openings. The distance between the center line of spoke 11 and the far edge of the land 14, measured adjacent the outer periphery of the disc, is greater than the distance between the center line of the spoke and the far edge of the wing 14 measured adjacent the neck 12. The same thing is true as to the wing 15, and the same thing is true as to each spoke in the form shown in Fig. 5. The apertures 50, 51 and 52, as shown, are located so as to give the outer beam more width than the inner beam, thus to increase its strength substantially proportional to its increased length. With the apertures positioned and formed substantially as shown, the force required to collapse the beams is about the same. If the apertures are shifted radially outwardly, the outer beams will be weakened and the inner strengthened; if the apertures are shifted relatively inwardly, the inner beams will be weakened and the outer strengthened. In this manner the desired strength of the beams can be obtained. Moreover, since the tendency is for the beams to increase in length with increase in diameter, the spokes in Fig. 1 may be cut off as illustrated at 55 so that the outer beams are kept from being too long, and the spokes shown in Fig. 5 may be cut off as illustrated at 56 for the same purpose.

In a cushion clutch disc of this type it is desirable, as above pointed out, that initial compression takes place against a relatively low resistance but wherein the resistance increases as the compression of the disc continues. A curve plotted to show this desired characteristic is one which is fairly flat in the early stages of clutch engagement and such a curve is illustrated in Fig. 10, this curve being plotted from a disc constructed in accordance with Fig. 5. Here it will be noted that the curve is fairly flat initially, and in fact a load of about 300 lbs. causes a deflection of about .040 of an inch. At about 1300 lbs. of load, the deflection has increased to .060 of an inch, it being apparent that the final thousand lbs. of load increased the deflection only about .020 of an inch. The present construction accomplishes this result in an admirable fashion because in initial clutch engagement the deflection is caused by twisting of the spokes as the facings shift toward each other. Ultimately the spokes of bend formation will be packed between the facings and then upon the application of increased clutch pressure the tendency is to straighten out the spokes. The initial torsion and the final bending merge into each other to form such a curve as is plotted in Fig. 10. A total deflection of about .060 of an inch as shown in Fig. 10, is about the maximum deflection desired, and in fact in many instances the clutch will be constructed to give a total deflection of less than .060 of an inch, although the curve shown illustrates the point in mind.

In the form illustrated in Fig. 11, one facing is illustrated at 60 and another at 61. Instead of each spoke having portions lying normally out of the center plane of the disc, only some of the spokes are thus formed, as for example, alternate spokes, as illustrated. One facing such as the facing 60 is secured to spokes 62 as by means of rivets 63, and the spokes 62 lie in the plane of the disc. Alternate spokes 64 have angular portions 65 and lands 66, preferably parallel to the plane of the disc. The facing 61 is secured to the lands as by means of rivets 67. The lands 66 and angular portion 65 merge together substantially on bend lines 68. Each facing may have clearance apertures for the rivets of the other as illustrated at 69 and 70. In this form the lands 66 may be off-set relative to the center plane of the disc twice the amount of the off-set of the lands 35 and 34 of the Fig. 5 form, and the lands 14 and 15 of the Fig. 1 form, so that the normal spacing between the facings 60 and 61 is the same as the normal spacing between the facings of the other forms.

The spokes 64 take care of all of the deflection. In the first action of clutch engagement the portions 65 are twisted and then when the facings are brought close enough together so that the spokes 64 act as bridges, they are flattened by the bending action along the bend lines 68. This structure also has an advantage in that the edges of the spokes 64, as indicated at 71, engage across the facing 60. When pressure is applied to the lands 66 the cantilever action tending to bend the spokes laterally of the plane of the disc is resisted by the contact at 71. The shape and dimensions of these spokes may be designed to give the required engagement curve as above discussed in connection with the other forms. The spokes 64 in this form may be shaped substantially like the spokes 33 in Fig. 5, that is with an extension on one side forming an enlargement, but the spokes at 62 may or may not have enlarged heads.

In all of the forms a good wear pattern on the facings is provided because of the many points of support given to the facings and because the supports extend substantially completely across the facings from the inner to the outer peripheral edges. The clutch disc shown in Fig. 1 has nine spokes for example. This gives nine initial supporting lands for each facing with the supports alternating on the facings and the supports extending substantially completely across the facings. In Fig. 5 where there may be eighteen spokes, for example, there are nine initial supports for each facing. The spoke heads of all forms act as units or in their entirety as differentiated from struck-out tongues or portions, and this contributes to the obtaining of a satisfactory wear pattern. As the spokes twist the entire head portions function on the facings. As the spokes bend the entire head portions bend. In this manner there are no localized points or spots which initially support the facings and which would be designed to give a bad wear pattern.

It will therefore be seen that the invention provides a cushion clutch member which, by combining a torsion action and a bending action, obtains a desired deflection curve and at the same time this is accomplished without the use of separate spring inserts. In fact, a minimum number of parts are required, namely, the disc itself and two facings. Of course, the invention can be used without the vibration dampening hub construction, in which event the disc 2 may be fastened directly to the hub 1. If a torsion action alone is employed the resistance to total deflection is not adequate where the disc 2 is made of the desired stock; in other words, if torsion alone is employed the disc 2 will have to be made of heavier, stronger stock. Thus the invention not only provides a structure wherein a desired nicety of deflection is obtained, but at the same stroke provides a clutch member essentially simple in construction and composed of a minimum number of parts.

I claim:

1. A clutch member comprising, a disc having L-shaped spokes in its outer zone with the free ends of the horizontal portions of the L of alternate spokes constituting lands and being disposed on alternate sides of the center plane of the disc and connected to the remaining parts of the horizontal portions of the L substantially on bend lines, a facing on each side of the disc with the facings connected to alternate lands, each spoke having an aperture therein cutting across the bend line to define a bent beam outwardly of the aperture and a bent beam inwardly of the aperture, the outer beams being of greater length than the inner beams said apertures being located to give the outer beams a greater width than the inner beams.

2. A clutch member comprising an inner disc-like body, a plurality of cushion members carried by and disposed radially outwardly from the body, each cushion member having a relatively narrow portion and a head portion disposed radially outwardly from the relatively narrow portion, the relatively narrow portion having one edge thereof substantially in alignment with one edge of the head portion, said head portion being enlarged circumferentially in one direction relative to the relatively narrow portion so that the head portion extends circumferentially beyond the other edge of the narrow portion so that the cushion member is of L shape and to provide a land, a pair of friction facing rings disposed on opposite sides of the head portions and outwardly from the body, the head portions of the cushion members having a radial dimension such as to extend substantially across the width of the facings, each cushion member having a substantially radially disposed bend line extending from a location in proximity to the said other edge of the relatively narrow portion to the outer edge of the head portion, the bend lines of alternate cushion members being oppositely formed so that the lands of alternate cushion members are spaced apart axially and are on opposite sides of the plane of the disc-like body, each facing ring lying against the lands of alternate spokes on the respective side of the center plane of the body, and means for connecting the facing rings respectively to the lands of alternate cushion members, whereby, as the facings are compressed toward each other the cushion members yield with combined torsion and bending actions.

ERNEST E. WEMP.

REFERENCES CITED

The following references are of record in the file of this patent:

UNITED STATES PATENTS

| Number | Name | Date |
| --- | --- | --- |
| 1,929,716 | Spase | Oct. 10, 1933 |
| 2,171,908 | Beringer | Sept. 5, 1939 |
| 2,180,746 | Saks | Nov. 21, 1939 |
| 2,195,666 | Wolfram | Apr. 2, 1940 |
| 2,221,463 | Wolfram | Nov. 12, 1940 |
| 2,244,134 | Thelander | June 3, 1941 |
| 2,304,039 | Tower | Dec. 1, 1942 |
| 2,314,948 | Nutt | Mar. 30, 1943 |
| 2,391,495 | Wemp | Dec. 25, 1945 |